(12) United States Patent
Iwahashi et al.

(10) Patent No.: US 8,604,902 B2
(45) Date of Patent: Dec. 10, 2013

(54) COMMUNICATION SYSTEM, INFORMATION PROCESSING METHOD, AND PROGRAM PRODUCT

(75) Inventors: Mitsugi Iwahashi, Kanagawa (JP); Taro Kurita, Tokyo (JP); Jinichi Morimura, Kanagawa (JP)

(73) Assignee: FeliCa Networks, Inc., Tokyo (JP)

( * ) Notice: Subject to any disclaimer, the term of this patent is extended or adjusted under 35 U.S.C. 154(b) by 1195 days.

(21) Appl. No.: 12/265,149

(22) Filed: Nov. 5, 2008

(65) Prior Publication Data

US 2009/0146776 A1    Jun. 11, 2009

(30) Foreign Application Priority Data

Nov. 19, 2007    (JP) ................................ P2007-299791

(51) Int. Cl.
*G05B 19/00*    (2006.01)

(52) U.S. Cl.
USPC ........... 340/5.6; 340/5.1; 340/5.61; 340/5.62; 340/5.63; 340/5.64; 340/5.66; 340/5.67; 340/10.1; 340/10.2; 340/10.3; 340/10.4; 340/10.5; 340/10.6; 340/572.1; 340/572.2; 340/572.3; 340/572.4; 340/572.5; 340/572.6; 340/572.7; 340/572.8; 235/375; 235/376; 235/377; 235/378; 235/379; 235/380; 235/381; 235/382; 235/383; 235/384; 235/385; 455/558

(58) Field of Classification Search
USPC ........... 340/10.1–10.6, 572.1–572.9, 5.1, 5.6, 340/5.61, 5.62, 5.63, 5.64, 5.65, 5.66, 5.67, 340/51, 56; 235/375–385; 455/558
See application file for complete search history.

(56) References Cited

U.S. PATENT DOCUMENTS

| | | | | |
|---|---|---|---|---|
| 5,491,741 A | * | 2/1996 | Farwell et al. | ................. 370/347 |
| 5,649,286 A | * | 7/1997 | Frerking | ................... 455/435.1 |
| 5,671,422 A | * | 9/1997 | Datta | ............................ 710/261 |
| 7,055,057 B2 | * | 5/2006 | Achiwa | .......................... 714/6.3 |
| 7,328,007 B2 | * | 2/2008 | Rajaram | ........................ 455/420 |
| 7,350,026 B2 | * | 3/2008 | Popescu et al. | ................ 711/119 |
| 7,426,396 B2 | * | 9/2008 | Iwasaki et al. | ............. 455/456.1 |
| 7,668,874 B2 | * | 2/2010 | Kawamura et al. | ........... 707/674 |
| 7,734,046 B2 | * | 6/2010 | Urban et al. | ..................... 380/46 |
| 7,873,767 B2 | * | 1/2011 | Moritani et al. | ................ 710/74 |

(Continued)

FOREIGN PATENT DOCUMENTS

| | | | |
|---|---|---|---|
| EP | 1998473 A1 * | 12/2008 | ............. H04L 29/08 |
| JP | 10-334033 | 12/1998 | |
| JP | 2004-159062 | 6/2004 | |
| JP | 2006-344043 | 12/2006 | |

*Primary Examiner* — George Bugg
*Assistant Examiner* — Paul Obiniyi
(74) *Attorney, Agent, or Firm* — Oblon, Spivak, McClelland, Maier & Neustadt, L.L.P.

(57) ABSTRACT

A communication system includes a first information processing device, a plurality of processing portions, a storage portion, and a second information processing device. The first information processing device includes a processing command transmission portion that transmits to the second information processing device, by non-contact communication, a processing command that includes one of a plurality of identification information items. Each of the processing portions is uniquely associated with one of the identification information items. The storage portion stores a correspondence information item that indicates a correspondence between one of the identification information items and one of the processing portions. The second information processing device includes a processing portion selection portion that selects one of the processing portions to execute the processing command received from the first information processing device, based on the correspondence information item stored in the storage portion and on the identification information item included in the processing command.

14 Claims, 4 Drawing Sheets

(56) References Cited

U.S. PATENT DOCUMENTS

| | | | |
|---|---|---|---|
| 7,930,423 B2* | 4/2011 | Tundlam et al. | 709/238 |
| 2003/0022665 A1* | 1/2003 | Rajaram | 455/420 |
| 2004/0193658 A1* | 9/2004 | Kawamura et al. | 707/202 |
| 2005/0127180 A1* | 6/2005 | Matsumoto et al. | 235/451 |
| 2005/0154937 A1* | 7/2005 | Achiwa | 714/6 |
| 2005/0173518 A1* | 8/2005 | Takayama | 235/380 |
| 2006/0022800 A1* | 2/2006 | Krishna et al. | 340/10.2 |
| 2006/0022801 A1* | 2/2006 | Husak et al. | 340/10.5 |
| 2006/0022815 A1* | 2/2006 | Fischer et al. | 340/505 |
| 2006/0123202 A1* | 6/2006 | Popescu et al. | 711/149 |
| 2007/0001810 A1* | 1/2007 | Scott et al. | 340/10.1 |
| 2007/0021150 A1* | 1/2007 | Noh | 455/558 |
| 2007/0041384 A1* | 2/2007 | Das et al. | 370/395.4 |
| 2007/0057057 A1* | 3/2007 | Andresky et al. | 235/451 |
| 2007/0174612 A1* | 7/2007 | Urban et al. | 713/168 |
| 2007/0198758 A1* | 8/2007 | Asano et al. | 710/110 |
| 2007/0294496 A1* | 12/2007 | Goss et al. | 711/163 |
| 2008/0059659 A1* | 3/2008 | Moritani et al. | 710/8 |
| 2008/0094183 A1* | 4/2008 | Fukushima et al. | 340/10.51 |
| 2008/0104392 A1* | 5/2008 | Satoshi et al. | 713/164 |
| 2008/0169907 A1* | 7/2008 | Ootsuka | 340/10.1 |
| 2008/0232283 A1* | 9/2008 | Jen | 370/310 |
| 2008/0250178 A1* | 10/2008 | Haustein et al. | 710/107 |
| 2008/0278294 A1* | 11/2008 | Konuma | 340/10.41 |
| 2008/0309463 A1* | 12/2008 | Godzwon et al. | 340/10.1 |

* cited by examiner

COMMUNICATION SYSTEM, INFORMATION PROCESSING METHOD, AND PROGRAM PRODUCT

CROSS REFERENCES TO RELATED APPLICATIONS

The present application contains subjected matter related to Japanese Patent Application JP 2007-299791 filed in the Japan Patent Office on Nov. 19, 2007, the entire contents of which being incorporated herein by reference.

BACKGROUND OF THE INVENTION

1. Field of the Invention

The present invention relates to a communication system, an information processing method, and a program.

2. Description of the Related Art

In recent years, mobile telephones and the like that are provided with non-contact integrated circuit (IC) cards (smart cards) and a non-contact IC card function have become widespread. These devices are used, for example, for public transportation ticket services, for bill payment services at retail stores, and the like. The non-contact IC card function can be provided not only in mobile telephones, but also in portable information terminals such as smart phones, personal digital assistants, and the like, as well as in information processing devices such as personal computers and the like. The non-contact IC card function may also include the provision of various types of services other than the ticket services and bill payment services described above. In some cases, even for the same type of service, the function may differ according to the provider who provides the service, and the different types of functions may be distinguished.

The function may be implemented through non-contact communication with a reader/writer that is capable of at least one of writing information to the device and reading information that is stored in the device. By performing an operation that holds the device described above up to a reader/writer that is compatible with specific services and specific providers, a user can avail himself of the services that the reader/writer supports. In a case where a plurality of services is provided by the same reader/writer, the user can utilize the function of the device to avail himself of the plurality of the services.

To date, the non-contact IC card function described above has mainly been implemented in a communication chip for non-contact communication and in a single integrated circuit chip (hereinafter called a "secure chip") that is provided with a tamper-proof secure storage area and a processing portion. The storage area has a hierarchical configuration that is organized according to one of the service and the provider. The utilization of the services is controlled by having the reader/writer perform access authentication for each level in the hierarchy. For example, in Japanese Patent Application Publication No. JP-A-2004-159062, a technology is disclosed that implements access control for a hierarchically organized storage area by using authentication information that is established for each level in the hierarchy. The same document also discloses a configuration of a communication device that is capable of containing, in a plurality of the secure chips, communication information that is set separately for each communication company.

SUMMARY OF THE INVENTION

However, as recognized by the present inventors, as the types of services and the number of the service providers increase, the hierarchical configuration of the storage area becomes complex. There is concern that this might diminish the speed of access to the storage area and make read processing and search processing more cumbersome. Accordingly, a method of configuring the storage area has been conceived that limits the complexity of the hierarchical configuration by providing one secure chip for each division that is established in a specified level of the hierarchy. However, if this method is used, then implementing the non-contact IC card function requires that one communication chip be provided for one secure chip. This leads to a more complicated device configuration and an increase in the surface area that is needed to mount the chips, such that providing the non-contact IC card function causes a steep increase in the cost.

Accordingly, the present invention addresses the issues described above and provides a communication system, an information processing method, and a program that are new and improved and that, based on an identification information item that is obtained by a single communication chip, can identify and select, from among a plurality of processing portions, the processing portion that corresponds to the identification information item.

In order to address the issues described above, according to an embodiment of the present invention, there is provided a communication system that includes a first information processing device, a plurality of processing portions, a storage portion, and a second information processing device. The first information processing device includes a processing command transmission portion that transmits a specified processing command that includes a specified one of a plurality of identification information items to the second information processing device by non-contact communication. Each of the plurality of the processing portions is uniquely associated with a specified one of the plurality of the identification information items. The storage portion stores a correspondence information item that indicates a correspondence relationship between a specified one of the plurality of the identification information items and one of the processing portions. The second information processing device includes a processing portion selection portion that, based on the correspondence information item that is stored in the storage portion and on the specified one of the plurality of the identification information items that is included in the processing command that is received from the first information processing device, selects one of the processing portions to execute the processing command.

The second information processing device may also include a correspondence information item storing portion that stores the correspondence information item in the storage portion. The plurality of the processing portions may also include a first processing portion that is capable of issuing a storage command to the correspondence information item storing portion to store an information item in the storage portion, and a second processing portion that does not issue the storage command. The correspondence information item storing portion may store in the storage portion the correspondence information item that corresponds to the specified one of the plurality of the identification information items by causing the first processing portion to issue the storage command to store the correspondence information item and then storing the correspondence information item according to the storage command.

The second information processing device may also be a portable communication device that is provided with one of a non-contact IC card and a non-contact IC card function. In this case, the first information processing device may also be a reader/writer that, through non-contact communication, one of writes an information item to the second information processing device and reads an information item from the second information processing device.

In order to address the issues described above, according to another embodiment of the present invention, there is provided an information processing method. The information processing method includes a step of acquiring a specified processing command that includes a specified one of a plurality of identification information items. The specified processing command is acquired through non-contact communication by an information processing device that has a plurality of processing portions that are each uniquely associated with a specified one of the plurality of the identification information items. The information processing method also includes a step of selecting one of the processing portions to execute the acquired processing command. The selection is based on the specified one of the plurality of the identification information items that is included in the processing command and on a correspondence information item. The correspondence information item is stored in a storage portion of the information processing device and indicates a correspondence relationship between the selected processing portion and the specified one of the plurality of the identification information items.

In order to address the issues described above, according to another embodiment of the present invention, there is provided a computer program that causes a computer to perform an information processing function that includes an acquisition function and a processing portion selection function. The acquisition function acquires a specified processing command that includes a specified one of a plurality of identification information items. The specified processing command is acquired through non-contact communication by an information processing device that has a plurality of processing portions that are each uniquely associated with a specified one of the plurality of the identification information items. The processing portion selection function selects one of the processing portions to execute the acquired processing command, based on the specified one of the plurality of the identification information items that is included in the processing command and on a correspondence information item. The correspondence information item is stored in a storage portion of the information processing device and indicates a correspondence relationship between the selected processing portion and the specified one of the plurality of the identification information items.

Using the configurations described above makes it possible for the first information processing device to use non-contact communication to switch among the plurality of the processing portions that are included in the second information processing device. Furthermore, in a case where there is a plurality of the first information processing devices, each of the first information processing devices transmits to the second information processing device a processing command that includes a unique identification information item, so the corresponding processing portion is selected automatically. Moreover, using the identification information item that is included in the processing command simplifies the device configuration that is used for the selection processing, making it possible to reduce the surface area within which the device configuration is mounted in the second information processing device. This can be expected to reduce the cost.

According to the embodiments of the present invention described above, based on the identification information item that one communication chip acquires, it is possible to identify and select, from among the plurality of the processing portions, the processing portion that corresponds to the identification information item.

DETAILED DESCRIPTION OF THE PREFERRED EMBODIMENTS

Figure 1:
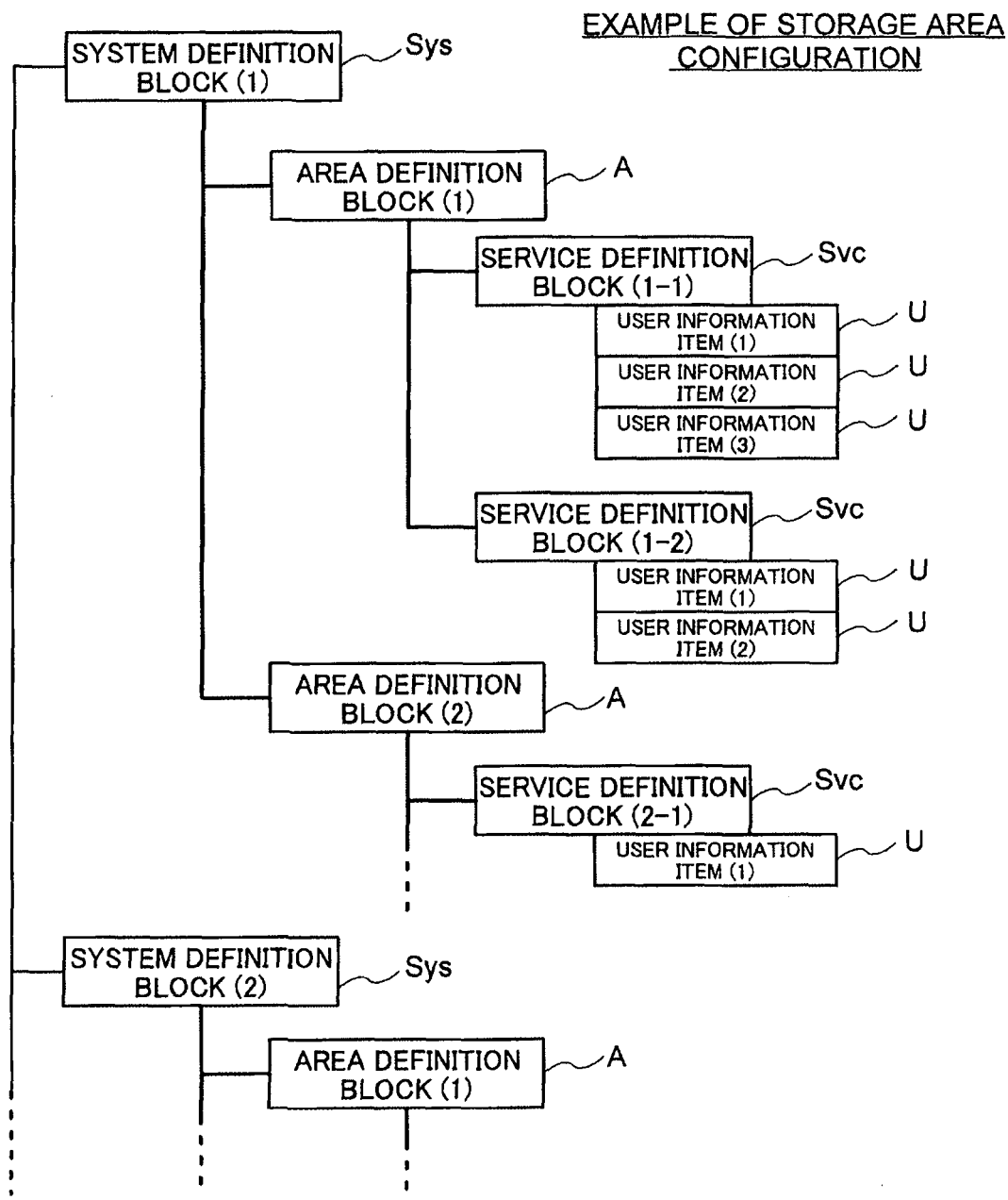
FIG. 1 is an explanatory figure that shows an example of a configuration of a storage area that has a hierarchical configuration.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Example of Storage Area Configuration

Before an embodiment of the present invention is explained, a hierarchical configuration of a storage area that is contained within a secure chip that is included in a non-contact IC card or the like will be briefly explained with reference to FIG. 1. FIG. 1 is an explanatory figure that shows an example of the hierarchical configuration of the storage area that is contained within the secure chip or the like.

As shown in FIG. 1, the storage area that is contained within the secure chip has a hierarchical configuration and starting from the top level, is configured from a system definition block Sys, and area definition block A, and a service definition block Svc. User information U is contained within the service definition block Svc.

System Definition Block Sys

The system definition block Sys contains, for example, a system code, system key information, system key version information, and the like. The system code is a code two bytes long that identifies a system manager that is associated with the system definition block Sys. The system key information is key information that is unique to each system and is used for mutual authentication that is performed when a reader/writer 10 accesses the system definition block Sys. The system key version information is information for performing generation management of the system key information. A system type (for example, a reader/writer 10 type or the like) is defined in the system definition block Sys based on the information items described above.

The area definition block A is at a level that is subordinate to the system definition block Sys. The area definition block A contains, for example, an area code, area key information, and area key version information. The area code is a code for identifying an area. An area is a unit that indicates a group of services that are managed collectively by the type of service. For example, an area may be a ticket area for collectively managing a plurality of services that have to do with tickets, a bill payment service area for collectively managing a plurality of services that have to do with bill payment, or the like. The area key information is key information that is unique to each area and is used for mutual authentication that is performed when the reader/writer 10 accesses the area definition block A. The area key version information is information for performing generation management of the area key information. An area type (for example, ticket, bill payment, or the like) is defined in the area definition block A based on the information items described above.

The service definition block Svc is at a level that is subordinate to the area definition block A. The service definition block Svc contains, for example, a service code, service key information, and service key version information. The service code is a code for identifying a service individually. A service is a unit that indicates a group of user information items U that are managed collectively by the type of user information. For example, a service may be a boarding zone service for managing boarding zones that a user uses, a bill payment service for managing bill payment information (for example, a balance or the like) that a user uses, or the like. The service key information is key information that is unique to each service and is used for mutual authentication that is performed when the reader/writer 10 accesses the service definition block Svc. The service key version information is information for performing generation management of the service key information. A service type (for example, boarding zone, balance, or the like) is defined in the service definition block Svc based on the information items described above.

The user information items U are specific information items that are contained in the service definition block Svc. For example, the user information items U that are associated with the boarding zone service contain information indicating specific boarding zones, such as "Boarding zone: Shinjuku", "Boarding zone: Ozaki", and the like. Further, the user information items U that are associated with the bill payment service contain information indicating specific balances, such as "100 yen balance", "100 points remaining", "100", and the like. The information that is contained in user information items U is actually written and read through the reader/writer 10.

As explained above, each level in the hierarchical configuration of the storage area contains the key information for mutual authentication, and mutual authentication is performed whenever any of the levels is accessed. This configuration makes it possible to manage the information securely at the system level, the area level, and the service level. It also makes it possible to control the authentication at the system level, the area level, and the service level. It is therefore easy to differentiate and manage information on system managers, area managers, and service providers. However, as the number of the systems and the number of the areas increase, the hierarchical configuration becomes more complex. This increases the processing load when search processing and authentication processing are performed at a specified level. Accordingly, an embodiment of the present invention provides a technology for switching among a plurality of the secure chips in a comparatively simple device configuration.

An embodiment of the present invention will be explained below. The present embodiment relates to a technology that identifies a system code that is included in a command that is obtained from the reader/writer 10 and selects a specified secure chip based on the identification. A device and a method for implementing the technology will be explained in detail below. A function of the device can also be implemented by controlling a computer based on a specified program, for example. The function can also be implemented using specialized hardware that is designed for implementing the function.

Figure 2:
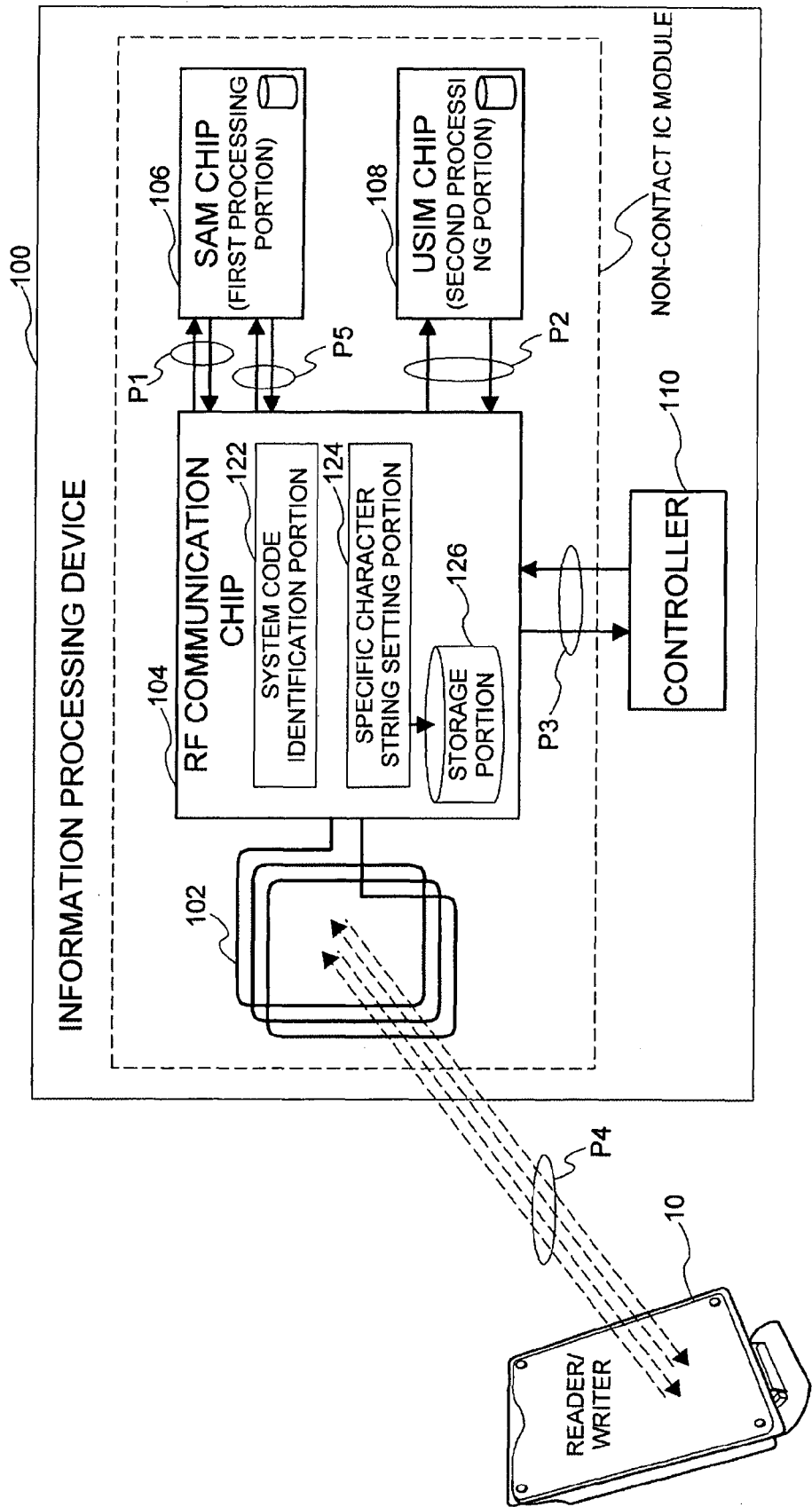
FIG. 2 is an explanatory figure that shows a functional configuration of an information processing device according to an embodiment of the present invention.

A functional configuration of an information processing device 100 according to the present embodiment will be explained with reference to FIG. 2. FIG. 2 is an explanatory figure that shows the functional configuration of the information processing device according to the present embodiment. A communication system is configured by combining the reader/writer 10 and the information processing device 100. The reader/writer 10 is also an example of a first information processing device. The information processing device 100 is also an example of a second information processing device.

As shown in FIG. 2, the information processing device 100 is mainly configured from an antenna 102, an RF communication chip 104, a first processing portion 106, a second processing portion 108, and a controller 110.

The antenna 102 is an antenna device for transmitting and receiving information to and from the reader/writer 10 utilizing a carrier wave. The antenna 102 can use a loop antenna, for example. The antenna 102 can be used to transmit and receive information and can also be used as an electric power demand and supply device that receives a supply of electric power by utilizing an induced electromotive force that is induced by the carrier wave. The information and the electric power that is obtained through the antenna 102 is transmitted to the RF communication chip 104.

The RF communication chip 104 is a unit that transmits and receives information through the antenna 102. The RF communication chip 104 takes a command that is included in the information that is obtained through the antenna 102, transmits the command to one of the first processing portion 106 and the second processing portion 108, and executes the command. In this process, the RF communication chip 104 selects the destination to which it transmits the command based on the system code that is included in the command that is obtained through the antenna 102. The RF communication chip 104 includes a system code identification portion 122, a specific character string setting portion 124, and a storage portion 126.

The system code identification portion 122 obtains the system code that is included in the command that is received from the reader/writer 10 and determines whether or not an information item (hereinafter called a "specific character string") that corresponds to the system code is stored in the storage portion 126. In a case where the system code identification portion 122 determines that the specific character string that corresponds to the system code is stored in the storage portion 126, the system code identification portion 122 selects the processing portion (one of the first processing portion 106 and the second processing portion 108) that corresponds to the specific character string. The system code identification portion 122 then transmits the received command to the selected processing portion. The system code identification portion 122 is an example of a processing portion selection portion. Furthermore, the specific character string is an information item that is associated with both the system code and the processing portion and is an example of a correspondence information item. In addition, the system code is an example of an identification information item.

Figure 3:
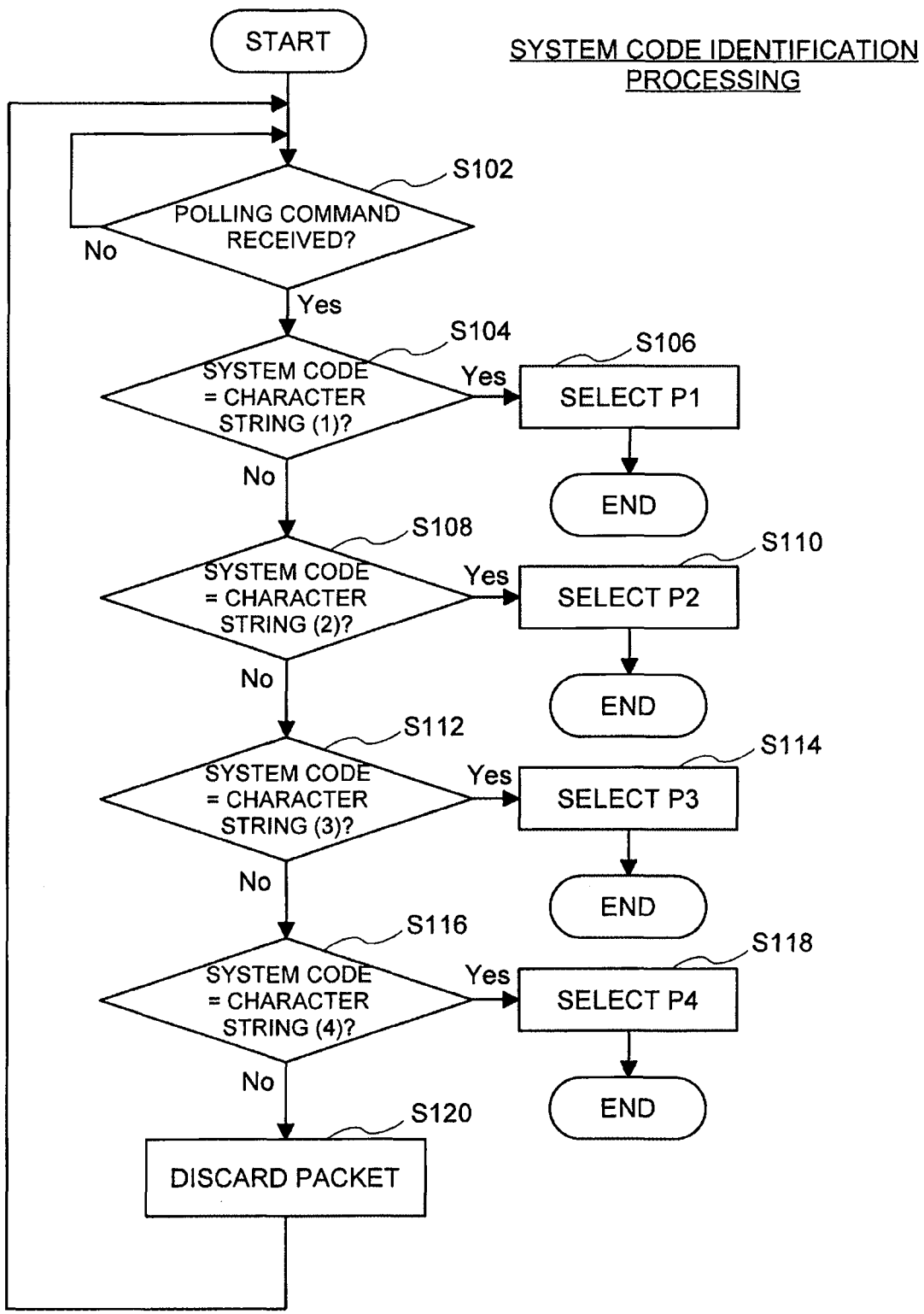
FIG. 3 is an explanatory figure that shows a flow of identification processing of a system code according to the embodiment.

System code identification processing by the system code identification portion 122 will be explained more specifically with reference to FIG. 3. FIG. 3 is an explanatory figure that shows the flow of the system code identification processing according to the present embodiment.

As shown in FIG. 3, the system code identification portion 122 determines whether or not a polling command has been received from the reader/writer 10 (Step S102). In a case where the polling command has been received, the system code identification portion 122 proceeds to the processing at Step S104. In a case where the polling command has not been received, the system code identification portion 122 waits for the polling command to be received.

At Step S104, the system code identification portion 122 determines whether or not a system code that is included in the polling command corresponds to a character string (1) that is stored in the storage portion 126 (Step S104). In a case where the system code matches the character string (1), the system code identification portion 122 selects an interface P1 (Step S106), and terminates the identification processing. In a case where the system code does not match the character string (1), the system code identification portion 122 proceeds to the processing at Step S108.

At Step S108, the system code identification portion 122 determines whether or not the system code that is included in the polling command corresponds to a character string (2) that is stored in the storage portion 126 (Step S108). In a case where the system code matches the character string (2), the system code identification portion 122 selects an interface P2 (Step S110), and terminates the identification processing. In a case where the system code does not match the character string (2), the system code identification portion 122 proceeds to the processing at Step S112.

At Step S112, the system code identification portion 122 determines whether or not the system code that is included in the polling command corresponds to a character string (3) that is stored in the storage portion 126 (Step S112). In a case where the system code matches the character string (3), the system code identification portion 122 selects an interface P3 (Step S114), and terminates the identification processing. In a case where the system code does not match the character string (3), the system code identification portion 122 proceeds to the processing at Step S116.

At step S116, the system code identification portion 122 determines whether or not the system code that is included in the polling command corresponds to a character string (4) that is stored in the storage portion 126 (Step S116). In a case where the system code matches the character string (4), the system code identification portion 122 selects an interface P4 (Step S118), and terminates the identification processing. In a case where the system code does not match the character string (4), the system code identification portion 122 proceeds to the processing at Step S120. At step S120, the system code identification portion 122 discards the received packet (Step S120) and returns to a state of waiting for the polling command to be received (Step S102).

In the course of the processing described above, the system code identification portion 122 identifies a correspondence relationship between the system code and a type of interface. The character strings (1) to (4) described above are examples of the specific character string. Further, the polling command is an example of a processing command that can also be, for example, a registration request command that is described later, a command that is executed by one of the processing portions, or the like. In the explanation above, the specific character strings that are stored in the storage portion 126 are correspondence information items that correspond to the individual interfaces. However, the specific character strings may also be correspondence information items that correspond directly to the individual processing portions.

Refer again to FIG. 2. The specific character string setting portion 124 stores the specific character string in the storage portion 126 in response to the registration request command for registering the specific character string, the command being received from one of the reader/writer 10 and the controller 110. When the specific character string setting portion 124 receives the registration request command from one of the reader/writer 10 and the controller 110, the specific character string setting portion 124 transmits a storage command issuance request command to the first processing portion 106. In response to a storage command that is issued by the first processing portion 106, the specific character string setting portion 124 stores the specific character string in the storage portion 126.

The specific character string setting processing will be explained more specifically using an example of a case in which the registration request command has been transmitted from the controller 110. First, the registration request command for registering the specific character string that corresponds to a specified system code is transmitted by the controller 110 through the interface P3. Next, the specific character string setting portion 124 transmits, through the interface P1, the issuance request command that requests that the first processing portion 106 issue the storage command. In response to the issuance request command that was obtained through the interface P1, the first processing portion 106 issues the storage command for storing the specific character string in the storage portion 126. The first processing portion 106 then transmits the storage command to the specific character string setting portion 124 through an interface P5. Then, in response to the storage command that was obtained through the interface P5, the specific character string setting portion 124 stores the specific character string in the storage portion 126.

As described above, the specific character string registration processing is executed through the first processing portion 106. Therefore, during the registration processing, direct access and control processing by the controller 110 and the reader/writer 10 are restricted, making the information that is held by the RF communication chip 104 more secure.

The first processing portion 106 may be, for example, a Secure Application Module (SAM) chip that holds secure information. In response to a command that is issued by one of the RF communication chip 104, the reader/writer 10, and the controller 110, the first processing portion 106 executes the processing that corresponds to the command. For example, if the first processing portion 106 receives through the RF communication chip 104 a write command that was issued by the reader/writer 10, the first processing portion 106 stores a specified information item in a specified storage area of a secure memory in response to the write command. If the first processing portion 106 receives a read command that was issued by the reader/writer 10, the first processing portion 106 reads a specified information item from the storage area in response to the read command. As described above, the first processing portion 106 issues the storage command in response to the storage command issuance request command.

The second processing portion 108 may also be a SAM chip, for example, and it may also be a Universal Subscriber Identity Module (USIM) chip that contains information for specifying a communication company and a user. The first processing portion 106 and the second processing portion 108 may differ from one another in various ways, for example, in the file formats in which they store information, in the transmission protocols they use to exchange information with the RF communication chip 104, and in the authentication information (the authentication keys) they use for authentication with the reader/writer 10 and the like. The second processing portion 108 may also be a memory device for storing information.

The controller 110 is provided outside of a non-contact IC module that provides non-contact IC card functions. The controller 110 controls functions of various configuring elements of the non-contact IC module through the RF communication chip 104. For example, the controller 110 performs control such that the specific character string that corresponds to the specified system code is stored in the storage portion 126.

A flow of processing by the information processing device 100 will be explained using a specific example. In the specific example that is explained below, it is assumed that the specific character string that corresponds to the specified system code is stored in the storage portion 126.

The reader/writer 10 transmits the polling command to the RF communication chip 104 through the interface P4. Next, the system code identification portion 122 searches among the specific character strings that are stored in the storage portion 126 for the specific character string that corresponds to the system code that is included in the polling command. In a case where the corresponding specific character string is not stored in the storage portion 126, the system code identification portion 122 transmits a command to the processing portion (for example, the first processing portion 106) that is normally used. In a case where the specific character string is stored in the storage portion 126 and corresponds to the second processing portion 108, the system code identification portion 122 transmits a command to the second processing portion 108.

The processing portion is selected dynamically according to command type information (for example, the two-byte system code that is included in the polling command), and the command is transmitted to the selected processing portion. In this manner, a function of communicating with a plurality of the processing portions (the first processing portion 106, the second processing portion 108) is implemented using the one RF communication chip 104. Using this sort of configuration makes it possible to reduce the surface area that is needed to mount the RF communication chip 104, even if a plurality of the processing portions are provided in the non-contact IC module. The configuration also makes it possible to use a plurality of the secure chips in which different applications are installed. It is therefore possible to provide a variety of functions comparatively easily. Because the RF communication chip 104 is driven by the command that is received from one the controller 110 and the reader/writer 10, it is possible for the RF communication chip 104 to be unaffected by any differences between the processing portions. This makes the system more flexible.

The functional configuration of the information processing device 100 has been explained. Using the functional configuration described above makes it possible for the information processing device 100 to select the processing portion dynamically according to the system code that is included in the polling command. Because the processing portion is selected by referring to the specific character string that is stored in the storage portion 126, it is possible for the processing portions that have different system configurations (configurations related to file formats, authentication information, and the like) to be controlled by the one RF communication chip 104. The technology according to the present embodiment can be used in various types of devices that are provided with non-contact IC cards, non-contact IC chips, and non-contact IC card functions, such as mobile telephones, portable information terminals, personal computers, game devices, and the like, for example.

Figure 4:
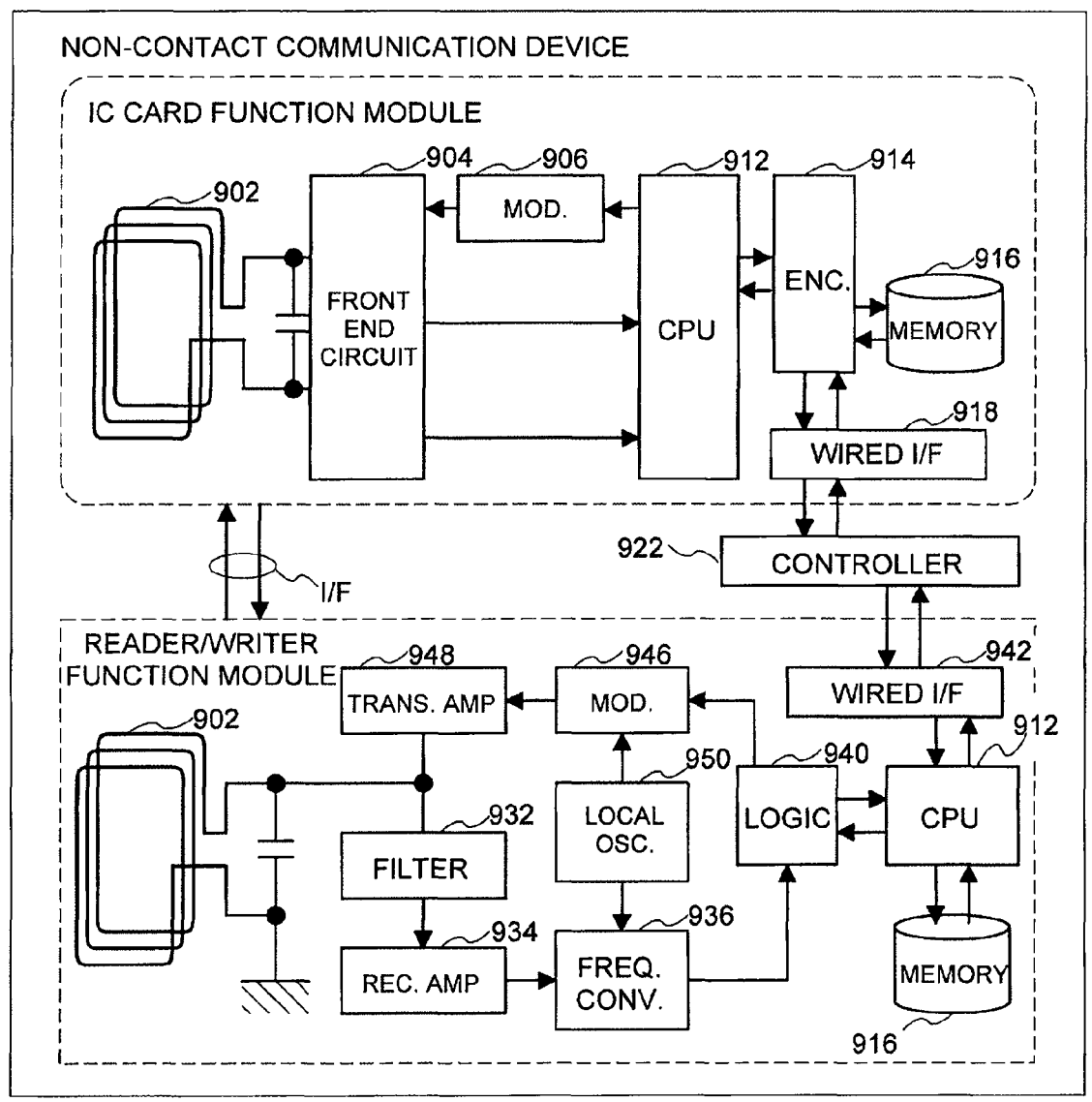
FIG. 4 is an explanatory figure that shows a hardware configuration of a non-contact communication device.

An example of hardware configuration of a non-contact communication device that is capable of implementing the functions of the device described above will be explained briefly with reference to FIG. 4. FIG. 4 is an explanatory figure that shows the hardware configuration of the non-contact communication device. Note that the functions of the device described above may also be implemented using only a portion of the configuring elements of the non-contact communication device. Furthermore, the configuring elements that have the same reference numerals may also be configured in a single hardware resource.

As shown in FIG. 4, the non-contact communication device is mainly configured from a IC card function module, a reader/writer function module, and a controller 922.

The IC card function module is configured from an antenna 902, a front end circuit 904, a modulator 906, a control circuit (CPU) 912, an encryption circuit 914, a memory 916, and a wired interface circuit 918, for example.

The antenna 902 is configured from a loop antenna, and it receives commands and electric power by being magnetically coupled to a loop antenna of a reader/writer. The front end circuit 904 generates direct current electric power by rectifying a carrier wave that is output from the reader/writer. The front end circuit 904 also divides the 13.56 MHz frequency of the received carrier wave to generate a clock signal for driving a logic circuit. The front end circuit 904 then supplies the electric power and the clock signal it has generated to the control circuit 912.

When the electric power is supplied to all of the circuits, the control circuit 912 drives each circuit according to the received command. Note that data that is output by the control circuit 912 is encrypted by the encryption circuit 914 and stored in the memory 916. Note that the memory 916 may be a storage device that stores information one of magnetically, optically, and magneto-optically, and may also be a semiconductor storage device that is used in a read only memory (ROM), a random access memory (RAM), or the like.

In a case where the encrypted data that is stored in the memory 916 is transmitted, the encrypted data is modulated by the modulator 906. Based on the modulated encrypted data, the front end circuit 904 varies the load impedance at a feeding point of the antenna 902 such that the magnetic field that is induced by the antenna 902 is varied according to the load impedance. The variations of the magnetic field transmit the encrypted data by inducing variations in the current that flows in the magnetically coupled loop antenna of the reader/writer.

The control circuit 912 may also be controlled by the controller 922 through the wired interface circuit 914. It is also possible for the IC card function module to transmit and receive information to and from the reader/writer function module, which is described below, through an interface I/F. This makes it possible for the IC card function module and the reader/writer function module to control one another and for one to control the other.

The reader/writer function module is configured from the antenna 902, a filter 932, a receiving amp 934, a frequency converter 936, an identification device 938, a logic circuit 940, the control circuit 912, the memory 916, a wired interface circuit 942, a modulator 946, a local oscillator 950, and a transmission amp 948, for example.

The reader/writer function module supplies commands and electric power by utilizing magnetic coupling to a non-contact IC card or the like. The reader/writer function module uses the control circuit 912 to supply electric power to and activate the non-contact IC card or the like, then starts communication in accordance with a specified transmission protocol. At this time, the reader/writer function module establishes a communication connection and performs anti-collision processing, authentication processing, and the like.

The reader/writer function module uses the local oscillator 950 to generate the carrier wave. In a case where information is transmitted, the control circuit 912 first reads data from the memory 916 and transmits the data to the logic circuit 940. Then the modulator 946 modulates the carrier wave that was generated by the local oscillator 950, based on a signal that is output from the logic circuit 940. The transmission amp 948 amplifies the modulated wave that is output from the modulator 946 and transmits the amplified wave through the antenna 902.

On the other hand, in a case where information is received, the modulated wave that is received through the antenna 902 is first passed through the filter 932, then input to the receiving amp 934. The signal is then amplified by the receiving amp 934, the signal frequency is converted by the frequency converter 936, and the signal is input to the logic circuit 940. The signal that is output from the logic circuit 940 is stored in the memory 916 by the control circuit 912. The signal may also be transmitted to the external controller 922 through the wired interface circuit 942.

It should be understood by those skilled in the art that various modifications, combinations, sub-combinations and alterations may occur depending on design requirements and other factors insofar as they are within the scope of the appended claims or the equivalents thereof.

For example, in the explanation above, an example was used in which the information processing device 100 has two secure chips, but the information processing device 100 may also have three or more secure chips. However, the information processing device 100 must be configured such that it includes one secure chip that is equivalent to the first processing portion 106.

What is claimed is:

1. A communication system, comprising:
   a first information processing device that includes a processing command transmission portion that transmits to a second information processing device, by a non-contact communication, a specified processing command that includes a specified one of a plurality of identification information items; and
   the second information processing device, which includes
      a plurality of processor chips that are each uniquely associated with a specified one of the plurality of the identification information items,
      a storage portion that stores a correspondence information item that indicates a correspondence relationship between a specified one of the plurality of the identification information items and one of the processor chips, the correspondence information item stored in the storage portion according to a storage command issued by one of the processor chips, the one of the processor chips that issued the storage command including a secure memory to store a specific information item, and
      a processing portion selection portion that selects one of the processor chips to execute the processing command that is received from the first information processing device, based on the correspondence information item that is stored in the storage portion and on the specified one of the plurality of the identification information items that is included in the processing command.

2. The communication system according to claim 1, wherein each of the plurality of processor chips includes a secure memory to store a specified information item.

3. The communication system according to claim 1, wherein the second information processing device further includes a correspondence information item storing portion, another of the plurality of processor chips does not issue the storage command, and the correspondence information item storing portion causes the one of the plurality of processor chips that issues the storage command to issue the storage command to the correspondence information item storing portion and then stores in the storage portion the correspondence information item in response to the storage command.

4. The communication system according to claim 1, wherein the second information processing device is a portable communication device that is provided with one of a non-contact IC card and a non-contact IC card function, and the first information processing device is a reader/writer that, through the non-contact communication, one of writes an information item to the second information processing device and reads an information item from the second information processing device.

5. An information processing device, comprising:
   a plurality of processor chips that process processing commands, wherein each of the plurality of processor chips is uniquely associated with a corresponding identification information item;
   a storage mechanism that stores correspondence information items that indicate correspondence relationships between each of the plurality of processor chips and the corresponding identification information item, one of the correspondence information items stored in the storage mechanism according to a storage command issued by one of the plurality of processor chips, the one of the plurality of processor chips including a secure memory to store a specific information item;
   an acquisition mechanism that acquires a specified processing command that includes one of the corresponding identification information items through a non-contact communication; and
   a selection mechanism that selects one of the plurality of processor chips to execute the specified processing command based on one of the correspondence information items stored in the storage mechanism.

6. An information processing method, including:
   acquiring a specified processing command that includes a specified one of a plurality of identification information items, the specified processing command being acquired through a non-contact communication by an information processing device that has a plurality of processor chips that are each uniquely associated with a specified one of the plurality of the identification information items; and
   selecting one of the processor chips to execute the acquired processing command, based on the specified one of the plurality of the identification information items that is included in the processing command and on a correspondence information item that is stored in a storage portion of the information processing device and that indicates a correspondence relationship between the selected processor chip and the specified one of the plurality of the identification information items, the correspondence information item stored in the storage portion according to a storage command issued by one of the processor chips, the one of the processor chips including a secure memory to store a specific information item.

7. A non-transitory computer program product having instructions that, when executed by a CPU, perform a method comprising:
   acquiring a specified processing command that includes a specified one of a plurality of identification information items, the specified processing command being acquired through a non-contact communication by an information processing device that has a plurality of processor chips that are each uniquely associated with a specified one of the plurality of the identification information items; and selecting one of the processor chips to execute the acquired processing command, based on the specified one of the plurality of the identification information items that is included in the processing command and on a correspondence information item that is stored in a storage portion of the information processing device and that indicates a correspondence relationship between the selected processor chip and the specified one of the plurality of the identification information items, the correspondence information item stored in the storage portion according to a storage command issued by one of the processor chips, the one of the processor chips including a secure memory to store a specific information item.

8. The information processing device according to claim 5, further comprising:
a non-contact IC module including the storage mechanism.

9. The information processing device according to claim 8, wherein the non-contact IC module also includes the plurality of processor chips, the acquisition mechanism, and an RF communication chip, the RF communication chip including the storage mechanism and the selection mechanism.

10. The information processing device according to claim 8, further comprising:
a controller outside of the non-contact IC module.

11. The information processing device according to claim 10, wherein the non-contact IC module includes an RF communication chip, the controller transmits a registration command to the RF communication chip, the RF communication chip transmits a storage request command to the one of the plurality of processor chips including the secure memory in response to the registration command, the one of the plurality of processor chips including the secure memory issues the storage command in response to the storage request command, and the storage mechanism stores the correspondence information item in response to the storage command.

12. The information processing device according to claim 5, wherein the one of the corresponding identification information items identifies a system manager associated with a system definition block.

13. The information processing device according to claim 12, wherein the one of the plurality of processor chips including the secure memory includes a storage area having a hierarchical configuration,
the hierarchical configuration including
the system definition block at a top level,
an area definition block below the system definition block, and
a service definition block below the area definition block and containing user information.

14. The information processing device according to claim 13, wherein the system definition block includes system key information that is unique to a system and is used for a mutual authentication when a reader/writer accesses the system definition block, the area definition block includes area key information that is unique to an area and is used for a mutual authentication when the reader/writer accesses the area definition block, and the service definition block includes service key information that is unique to a service and is used for a mutual authentication when the reader/writer accesses the service definition block.

* * * * *